US009188019B2

(12) United States Patent
Groves

(10) Patent No.: US 9,188,019 B2
(45) Date of Patent: Nov. 17, 2015

(54) TURBOCHARGER AND VARIABLE-NOZZLE ASSEMBLY THEREFOR

(71) Applicant: Honeywell International Inc., Morristown, NJ (US)

(72) Inventor: Chris Groves, Domevre sur Durbion (FR)

(73) Assignee: Honeywell International, Inc., Morris Plains, NJ (US)

( * ) Notice: Subject to any disclaimer, the term of this patent is extended or adjusted under 35 U.S.C. 154(b) by 553 days.

(21) Appl. No.: 13/677,893

(22) Filed: Nov. 15, 2012

(65) Prior Publication Data
US 2014/0133970 A1 May 15, 2014

(51) Int. Cl.
*F01D 17/00* (2006.01)
*F02B 37/00* (2006.01)
*F01D 17/16* (2006.01)
*F02C 6/12* (2006.01)

(52) U.S. Cl.
CPC .............. *F01D 17/00* (2013.01); *F01D 17/165* (2013.01); *F02B 37/00* (2013.01); *F02C 6/12* (2013.01)

(58) Field of Classification Search
CPC ........ F01D 17/00; F01D 17/16; F01D 17/165
USPC ........................ 415/146, 154.1, 159, 162–166
See application file for complete search history.

(56) References Cited

U.S. PATENT DOCUMENTS

| 2003/0039543 | A1* | 2/2003 | Osako et al. | 415/150 |
| 2010/0154415 | A1* | 6/2010 | Ehrhard | 60/605.1 |
| 2012/0251302 | A1* | 10/2012 | Ramb | 415/170.1 |
| 2013/0078082 | A1* | 3/2013 | Arnold et al. | 415/159 |

FOREIGN PATENT DOCUMENTS

| WO | WO 2011/066102 | 6/2011 | |
| WO | WO 2014042015 A1 * | 3/2014 | 415/150 |

* cited by examiner

*Primary Examiner* — Nathaniel Wiehe
*Assistant Examiner* — Woody A Lee, Jr.
(74) *Attorney, Agent, or Firm* — John C. James

(57) ABSTRACT

A variable-vane assembly includes a generally annular nozzle ring and an array of vanes rotatably mounted to the nozzle ring and connected to a rotatable actuator ring, and an insert having a tubular portion structured and arranged to be sealingly received into a bore of a turbine housing and having a nozzle portion extending generally radially out from one end of the tubular portion, the nozzle portion being axially spaced from the nozzle ring such that the vanes extend between the nozzle ring and the nozzle portion. A ring-shaped wire cage is disposed radially outwardly of the vanes and has one axial end rigidly affixed to the nozzle ring and an opposite axial end rigidly affixed to the nozzle portion so as to fix a spacing between the nozzle ring and the nozzle portion in an axial direction of the variable-vane assembly.

17 Claims, 8 Drawing Sheets

TURBOCHARGER AND VARIABLE-NOZZLE ASSEMBLY THEREFOR

BACKGROUND OF THE INVENTION

The present invention relates to turbochargers having a variable-nozzle turbine in which an array of movable vanes is disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

The variable vane mechanism is relatively complicated and thus presents a challenge in terms of assembly of the turbocharger. Furthermore, the mechanism is located between the turbine housing, which gets quite hot because of its exposure to exhaust gases, and the center housing, which is at a much lower temperature than the turbine housing. Accordingly, the variable vane mechanism is subject to thermal stresses because of this temperature gradient.

In one type of variable nozzle as noted above, the variable nozzle is provided in the form of a "cartridge" that is connected between the center housing and the turbine housing and comprises an assembly of a generally annular nozzle ring and an array of vanes circumferentially spaced about the nozzle ring and disposed in the nozzle such that exhaust gas flows between the vanes to the turbine wheel, each vane being rotatably mounted to the nozzle ring and connected to a rotatable actuator ring such that rotation of the actuator ring rotates the vanes for regulating exhaust gas flow to the turbine wheel. The cartridge includes an insert having a tubular portion sealingly received into the bore of the turbine housing and having a nozzle portion extending generally radially out from one end of the tubular portion, the nozzle portion being axially spaced from the nozzle ring such that the vanes extend between the nozzle ring and the nozzle portion. A small number of circumferentially spaced-apart spacers (e.g., three spacers spaced about 120 degrees apart) are connected between the nozzle portion of the insert and the nozzle ring for securing the nozzle ring to the insert and maintaining an axial spacing between the nozzle portion of the insert and the nozzle ring. The spacers are in close proximity to the vanes.

BRIEF SUMMARY OF THE INVENTION

The present disclosure relates to variable-vane assemblies generally of the type described above. Instead of employing spacers for fixing the desired axial spacing between the nozzle ring and the nozzle portion of the insert, however, an alternative spacing arrangement is employed, which causes substantially less disturbance to the flow of exhaust gas through the nozzle.

A variable-vane assembly for a variable-nozzle turbine in accordance with one embodiment described herein comprises a generally annular nozzle ring and an array of vanes circumferentially spaced about the nozzle ring, each vane being rotatably mounted to the nozzle ring and connected to a rotatable actuator ring such that rotation of the actuator ring relative to the nozzle ring rotates the vanes for regulating exhaust gas flow through the array of vanes. The assembly includes an insert having a tubular portion structured and arranged to be sealingly received into a bore of a turbine housing and having a nozzle portion extending generally radially out from one end of the tubular portion, the nozzle portion being axially spaced from the nozzle ring such that the vanes extend between the nozzle ring and the nozzle portion. The variable-vane assembly further comprises a ring-shaped wire cage disposed radially outwardly of the vanes and having one axial end rigidly affixed to the nozzle ring and an opposite axial end rigidly affixed to the nozzle portion so as to fix a spacing between the nozzle ring and the nozzle portion in an axial direction of the variable-vane assembly. The wire cage has a plurality of circumferentially spaced wires extending generally in the axial direction between the nozzle ring and the nozzle portion.

Each of the wires has a substantially smaller diameter or transverse dimension in comparison with the diameter of the spacers previously employed for spacing apart the nozzle ring and nozzle portion. Accordingly, even though there may be a substantially larger number of wires than the number of spacers previously used, the wires cause significantly less disturbance to the flow compared to the spacers. Any turbulent wakes coming off the wires will tend to re-converge and substantially dissipate before the exhaust gas reaches the vanes.

The wire cage can be formed in various ways and have various configurations. In one embodiment, the wire cage includes a first hoop portion rigidly affixed to the nozzle ring and a second hoop portion rigidly affixed to the nozzle portion, and opposite ends of each of the wires are rigidly affixed to the first and second hoop portions, respectively. A lengthwise direction of each of the wires can be parallel to the axial direction.

In another embodiment, the first and second hoop portions and the wires can be integral and of one piece with one another. For example, the wire cage can comprise a strip of metal foil formed into a hoop shape and having a plurality of circumferentially spaced apertures formed therein, the wires being defined by material of the foil that remains between adjacent ones of said apertures. The apertures can be triangular. The apertures can be arranged such that, proceeding in a circumferential direction about the wire cage, the wires alternately extend parallel to the axial direction and obliquely with respect to the axial direction. Alternatively, other aperture shapes, such as rectangular, can be used.

In a still further embodiment, the wire cage can comprise a continuous length of wire bent to undulate in a circumferential direction of the wire cage, such that the plurality of circumferentially spaced wires are integral portions of the continuous length of wire.

The wire cage can be affixed to the nozzle ring and the nozzle portion by spot welding or the like.

In certain embodiments described herein, the nozzle ring defines a cylindrical surface facing radially outward, and the nozzle portion defines a cylindrical surface facing radially outward, and the wire cage engages both of the cylindrical surfaces and is rigidly affixed thereto.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the term "wire" means an elongate member extending along a lengthwise direction and having a portion that is in the flow path of the nozzle and thus is wetted by exhaust gas flowing therethrough (referred to herein as the "wetted portion" of the wire), wherein a length dimension of the wetted portion in the lengthwise direction is at least five times a maximum dimension of a cross-section of the wetted portion on a plane normal to the lengthwise direction. For example, in the case of a circular wire having a diameter d, the length of the wetted portion is at least 5d. In the case of a rectangular wire whose cross-section has length and width l and w, respectively, where l>w, the length of the wetted portion is at least 5l.

Figure 1:
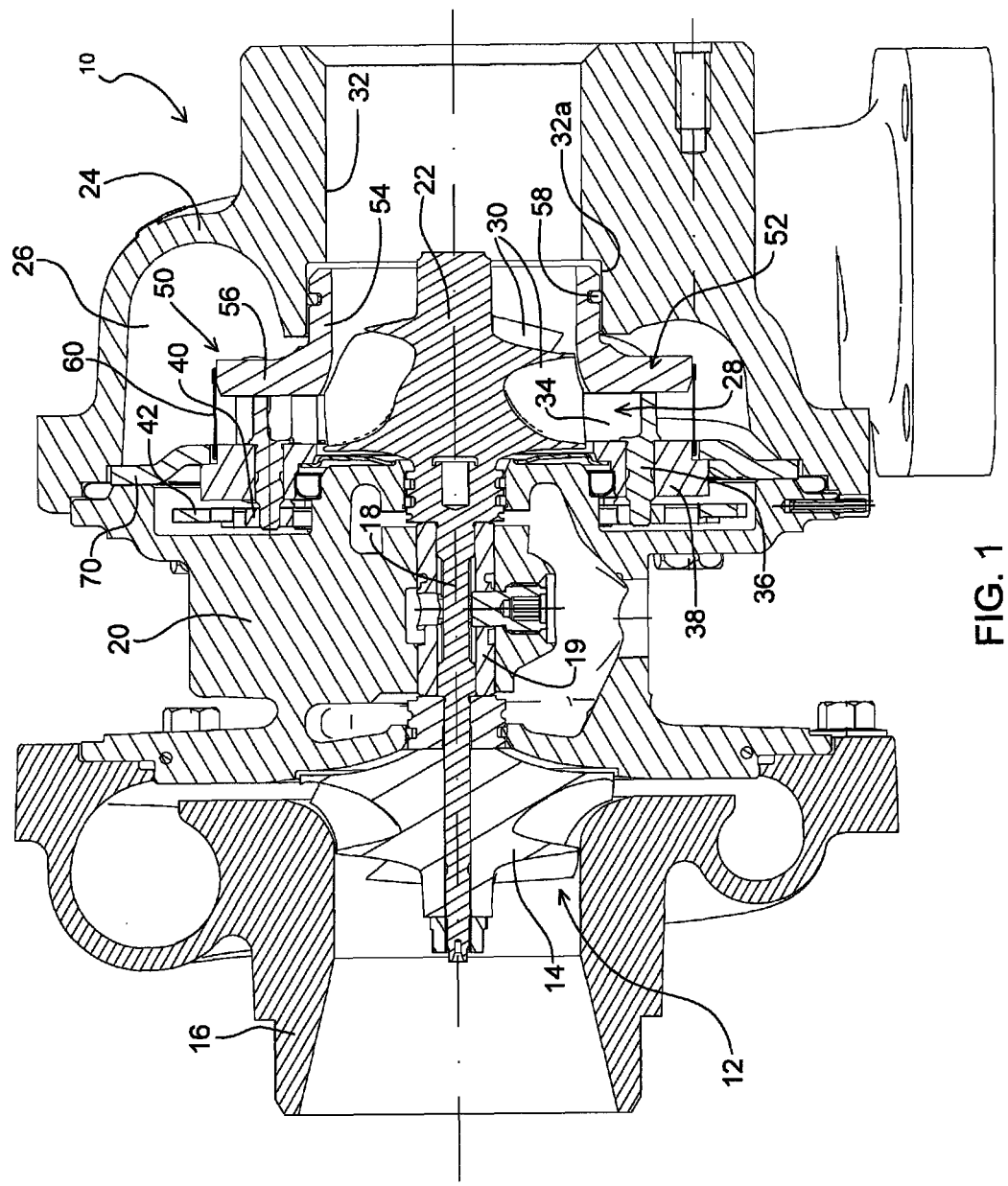
FIG. 1 is an axial cross-sectional view of a turbocharger having a variable-vane assembly in accordance with embodiments of the invention.

A turbocharger 10 in accordance with one embodiment of the invention is illustrated in FIG. 1. The turbocharger comprises a compressor 12 having a compressor wheel or impeller 14 mounted in a compressor housing 16 on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

The turbine nozzle 28 is a variable nozzle for varying the cross-sectional flow area through the nozzle so as to regulate flow into the turbine wheel. The nozzle includes a plurality of vanes 34 that are circumferentially spaced about the nozzle. Each vane is affixed to a pin 36 that passes through an aperture in a generally annular nozzle ring 38 that is mounted coaxially with respect to the turbine wheel 22. Each pin 36 is rotatable about its axis for rotating the attached vane. The nozzle ring 38 forms one wall of the flow passage of the nozzle 28. Each of the pins 36 has a vane arm 40 affixed to an end of the pin that protrudes out from the nozzle ring 38, and is engaged by a generally annular unison ring 42 (also referred to herein as an actuator ring) that is rotatable about its axis and that is coaxial with the nozzle ring 38. An actuator (not shown) is connected to the unison ring 42 for rotating it about its axis. When the unison ring is rotated, the vane arms 40 are rotated to cause the pins 36 to rotate about their axes, thereby rotating the vanes 34 so as to vary the cross-sectional flow area through the nozzle 28. As described thus far, the variable nozzle mechanism generally corresponds to a conventional variable nozzle having variable vanes.

The variable vane mechanism is provided in the form of a cartridge 50 that is installable into and removable from the turbocharger as a unit. The cartridge 50 comprises the nozzle ring 38, vanes 34, pins 36, vane arms 40, and unison ring 42. The cartridge further comprises an insert 52 that has a tubular portion 54 sealingly received into a portion 32a of the bore 32 of the turbine housing, and a nozzle portion 56 extending generally radially out from one end of the tubular portion 54, the nozzle portion 56 being axially spaced from the nozzle ring 38 such that the vanes 34 extend between the nozzle ring 38 and the nozzle portion 56. The bore portion 32a of the turbine housing has a radius that exceeds that of the remainder of the bore 32 by an amount slightly greater than the radial thickness of the tubular portion 54 of the insert 52. The radially outer surface of the tubular portion 54 has at least one circumferential groove, in which a sealing ring 58 is retained for sealingly engaging the inner surface of the bore portion 32a. Advantageously, the outer diameter of the tubular portion 54 of the insert is slightly less than the inner diameter of the bore portion 32a so that a slight gap is defined therebetween, and only the sealing rings 58 make contact with the inner surface of the bore portion 32a.

The description of the variable vane assembly or cartridge 50 thus far is similar to assemblies existing prior to the present invention. In prior such assemblies, however, the nozzle ring 38 has been affixed to and spaced from the insert 52 by a small number (e.g., 3) of relatively large-diameter spacers. In one such assembly, for example, each spacer passes through an aperture in the nozzle portion 56 of the insert and has an enlarged head on the side of the nozzle portion that faces away from the nozzle 28. Each spacer also has a pair of enlarged shoulders axially spaced along the length of the spacer such that one shoulder abuts the opposite side of the nozzle portion 56 and the other shoulder abuts the facing surface of the nozzle ring 38, thereby setting the axial spacing between the nozzle ring and nozzle portion. An end portion of each spacer passes through an aperture in the nozzle ring 38 and the distal end of this end portion is upset to form an enlarged head to capture the nozzle ring.

The spacers in such prior assemblies are in relatively close proximity to the vanes 34. The relatively large size of the spacers and their close proximity to the vanes causes a flow restriction and a reduction in aerodynamic performance and controllability of the nozzle assembly.

The present invention seeks to overcome these drawbacks by positioning a relatively large number of spacer "wires" at a maximum possible distance from the vanes. The relatively small wakes of the wires will rapidly re-converge before the flow enters the vane passages.

Figure 2:
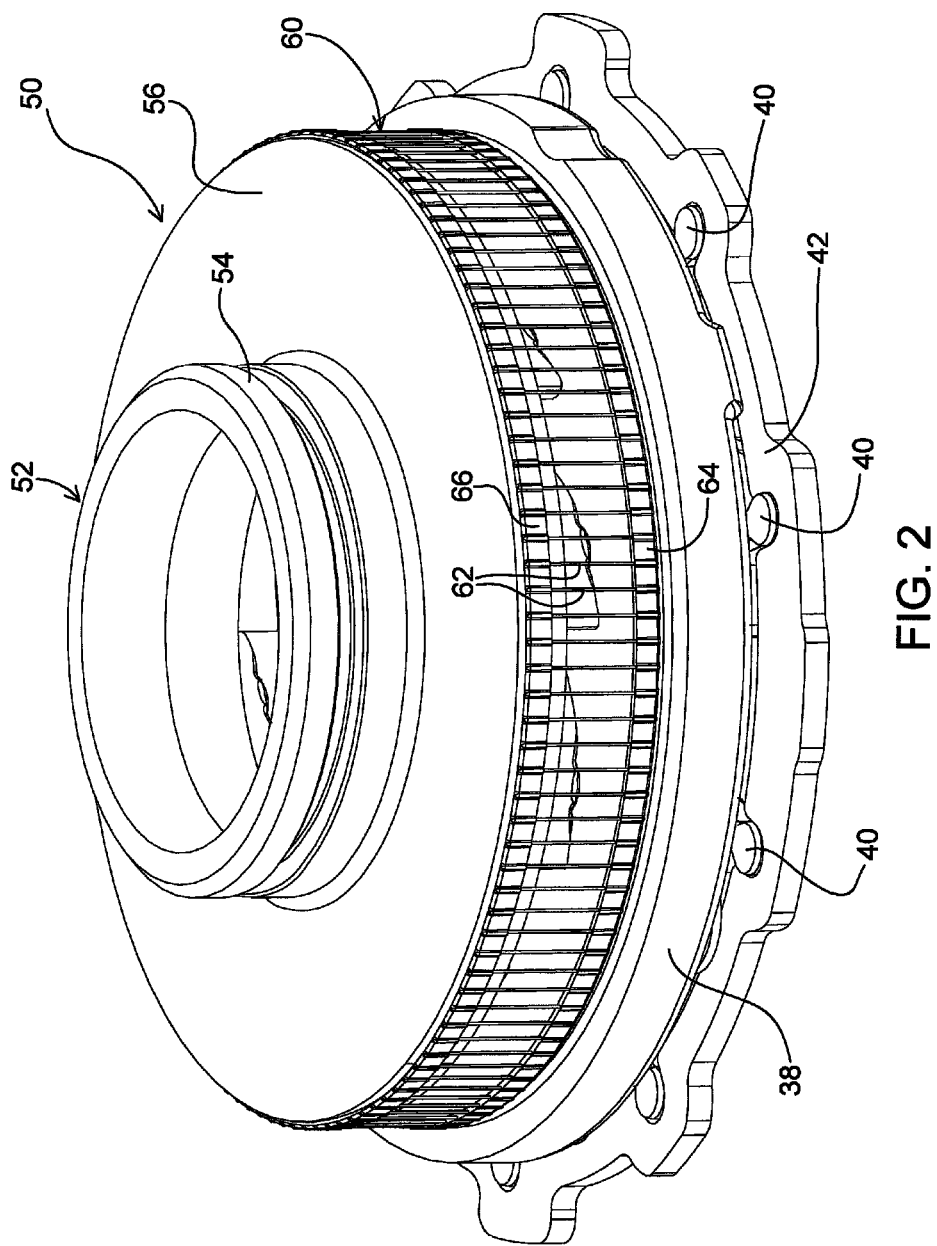
FIG. 2 is a perspective view of a variable-vane assembly in accordance with one embodiment of the invention.

With respect to FIGS. 1-5, the construction of the cartridge 50 in accordance with a first embodiment of the invention is now described. The cartridge employs a ring-shaped wire cage 60 (shown in isolation in FIG. 3). The wire cage 60 comprises a relatively large number of wires 62, a first hoop portion 64, and a second hoop portion 66. First ends of the wires 62 are rigidly affixed to the first hoop portion 64, and opposite second ends of the wires are rigidly affixed to the second hoop portion 66. The wires 62 are shown in the figures as uniformly spaced about the circumference, and parallel to one another, but neither uniform spacing nor parallel orientation is necessary. As shown in FIG. 2, the first hoop portion 64 is rigidly affixed to the nozzle ring 38 and the second hoop portion 66 is rigidly affixed to the nozzle portion 56 of the insert 52. In particular, the hoop portions are rigidly affixed to radially outer peripheral regions of the nozzle ring and nozzle portion. It will be noted that the nozzle ring 38 has a stepped portion at its outer periphery, such that there is a larger-diameter portion adjacent the side of the nozzle ring confronting the unison ring 42, and a smaller-diameter portion adjacent the nozzle 28. The first hoop portion 64 of the wire cage is rigidly affixed to this smaller-diameter portion of the nozzle ring. The stepped portion is provided to enable the nozzle ring to be axially located by a retaining ring 70 (FIG. 1) that contacts an axially facing surface of the resulting step. The step is large enough to provide room for the wire cage 60 such that the cage is not contacted by the retaining ring.

Figure 3:
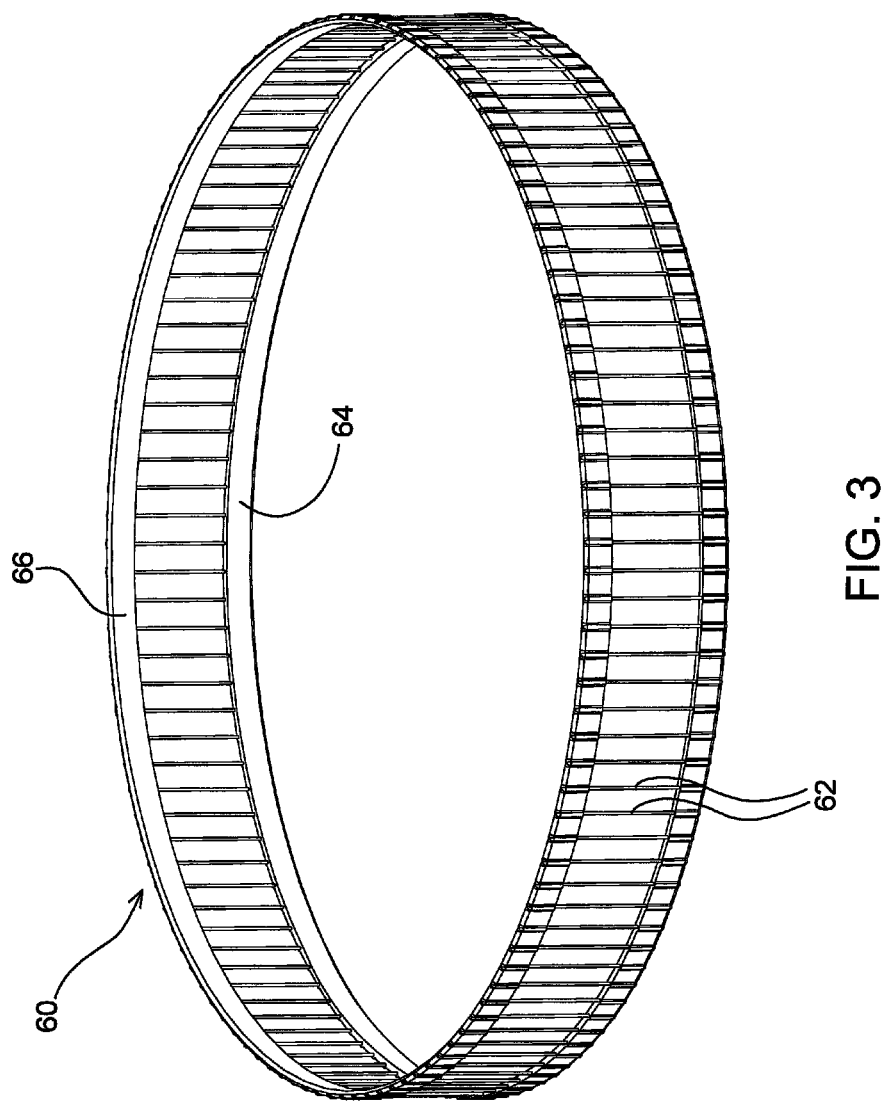
FIG. 3 is a perspective view of a wire cage used in the variable-vane assembly of FIG. 1.
Figure 4:
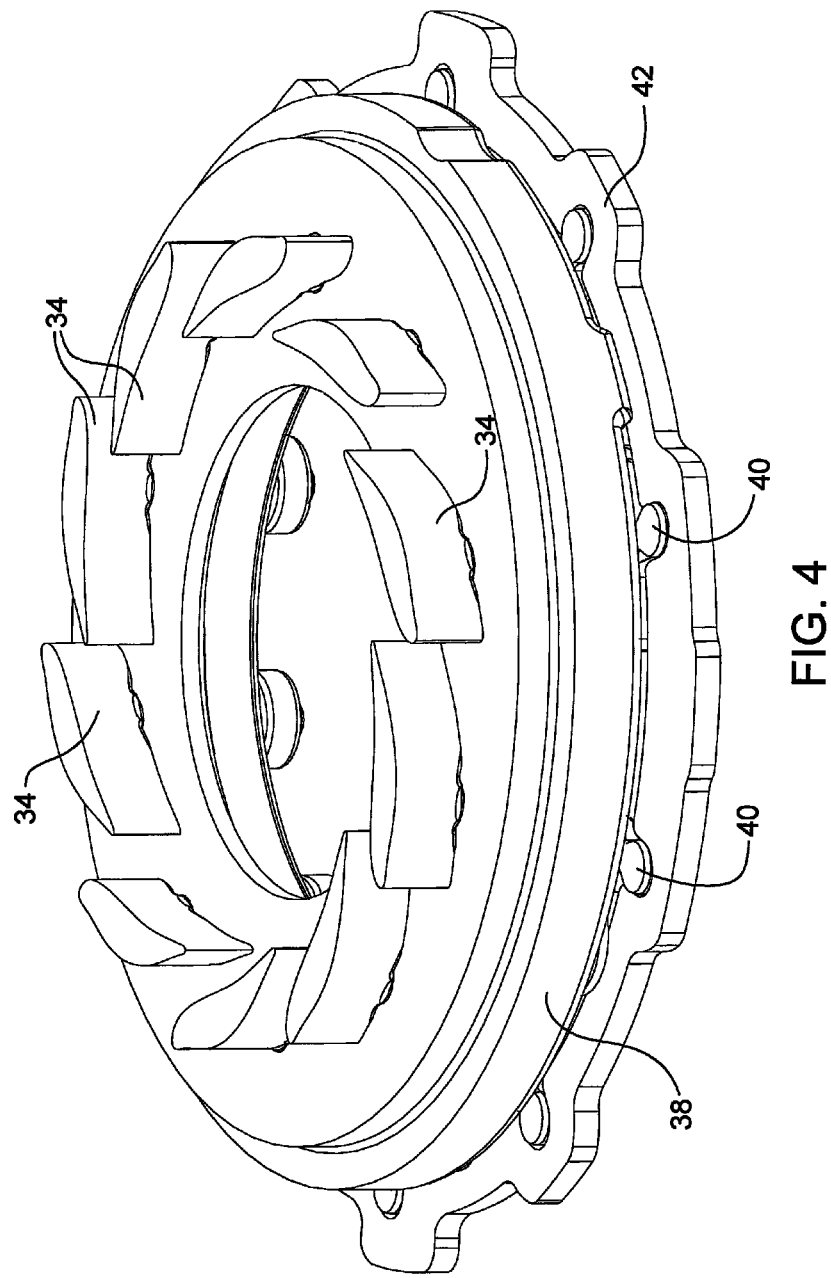
FIG. 4 is a perspective view of a sub-assembly for the variable-vane assembly of FIG. 1.
Figure 5:
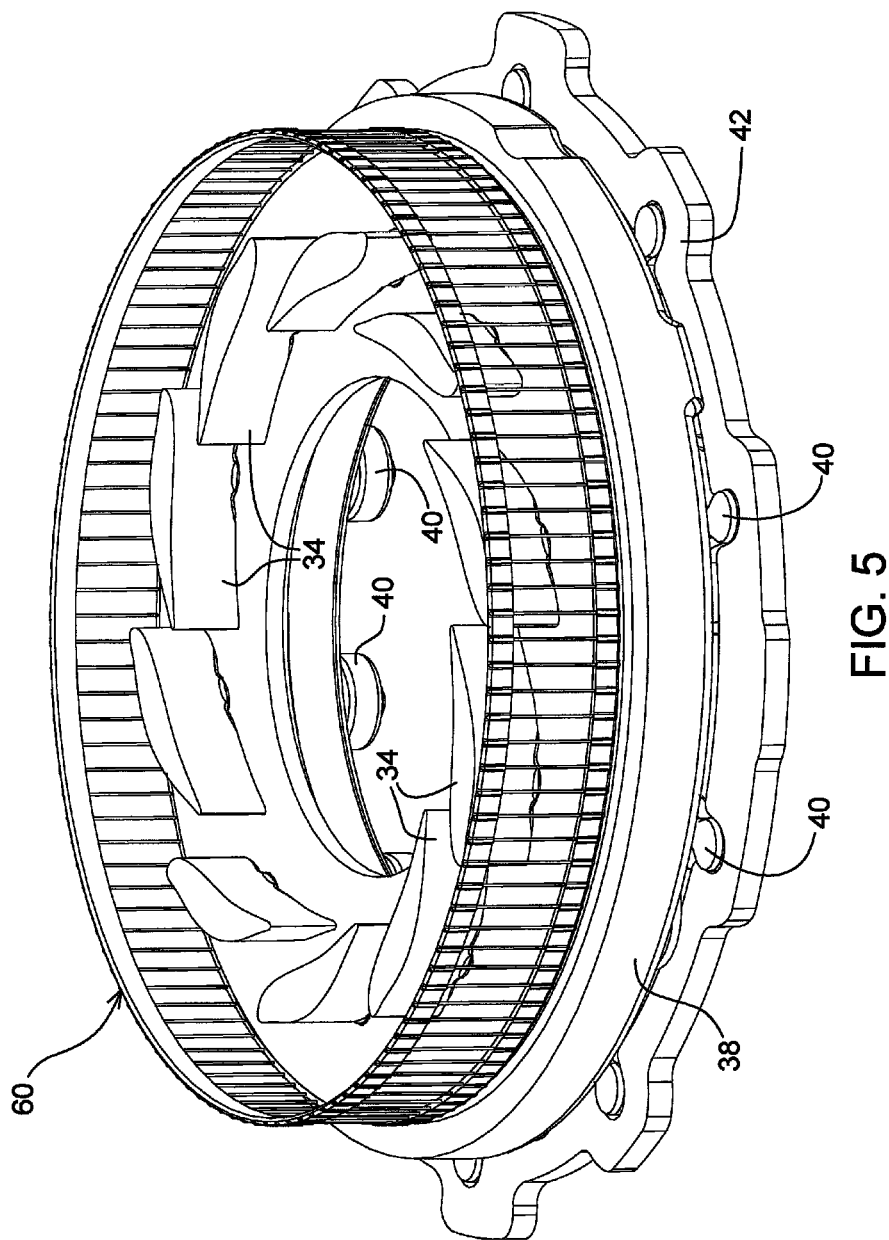
FIG. 5 is a perspective view showing the wire cage of FIG. 3 assembled with the sub-assembly of FIG. 4.

The wire cage 60 as depicted in FIG. 3 is constructed from multiple pieces. The wires 62 are all separate from one another and from the two separate hoop portions 64 and 66. As such, the assembly of the cage 60 requires operations to affix the wires to the hoop portions. One illustrative assembly process for example is to arrange short lengths of round wire with the ends of the wires encased (and/or welded) in a crimped metal tape, the opposite ends of the wires likewise being encased (and/or welded) in a second crimped metal tape.

Figure 6:
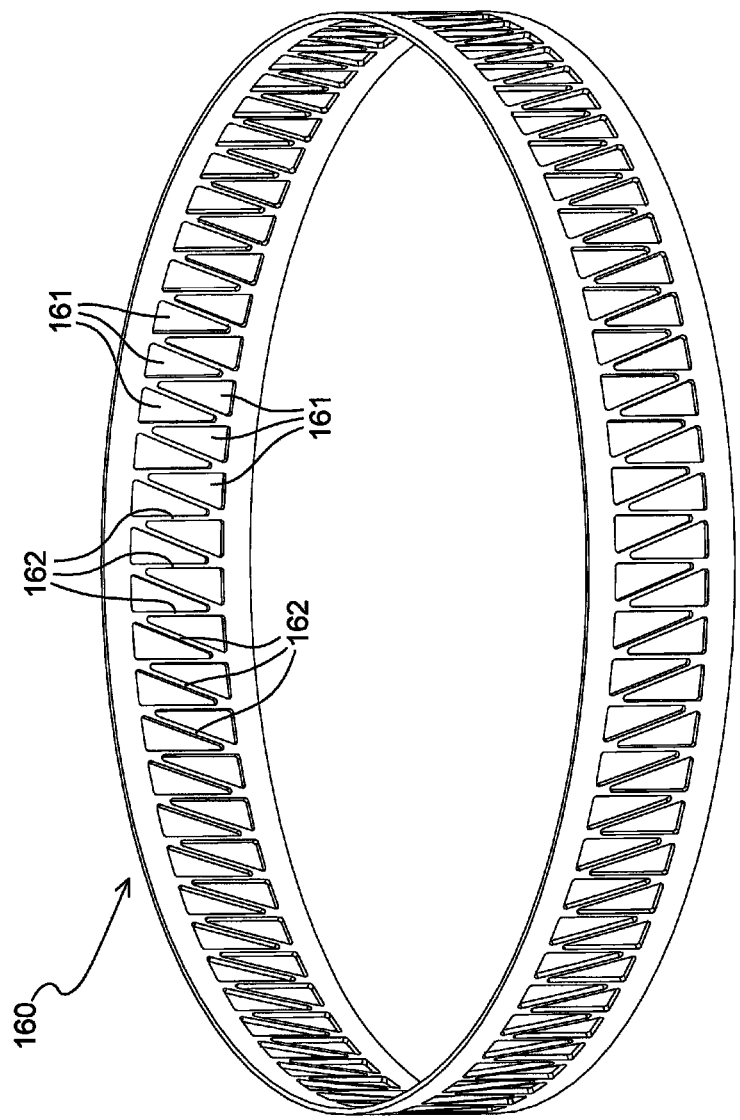
FIG. 6 is a perspective view of a wire cage in accordance with another embodiment.
Figure 7:
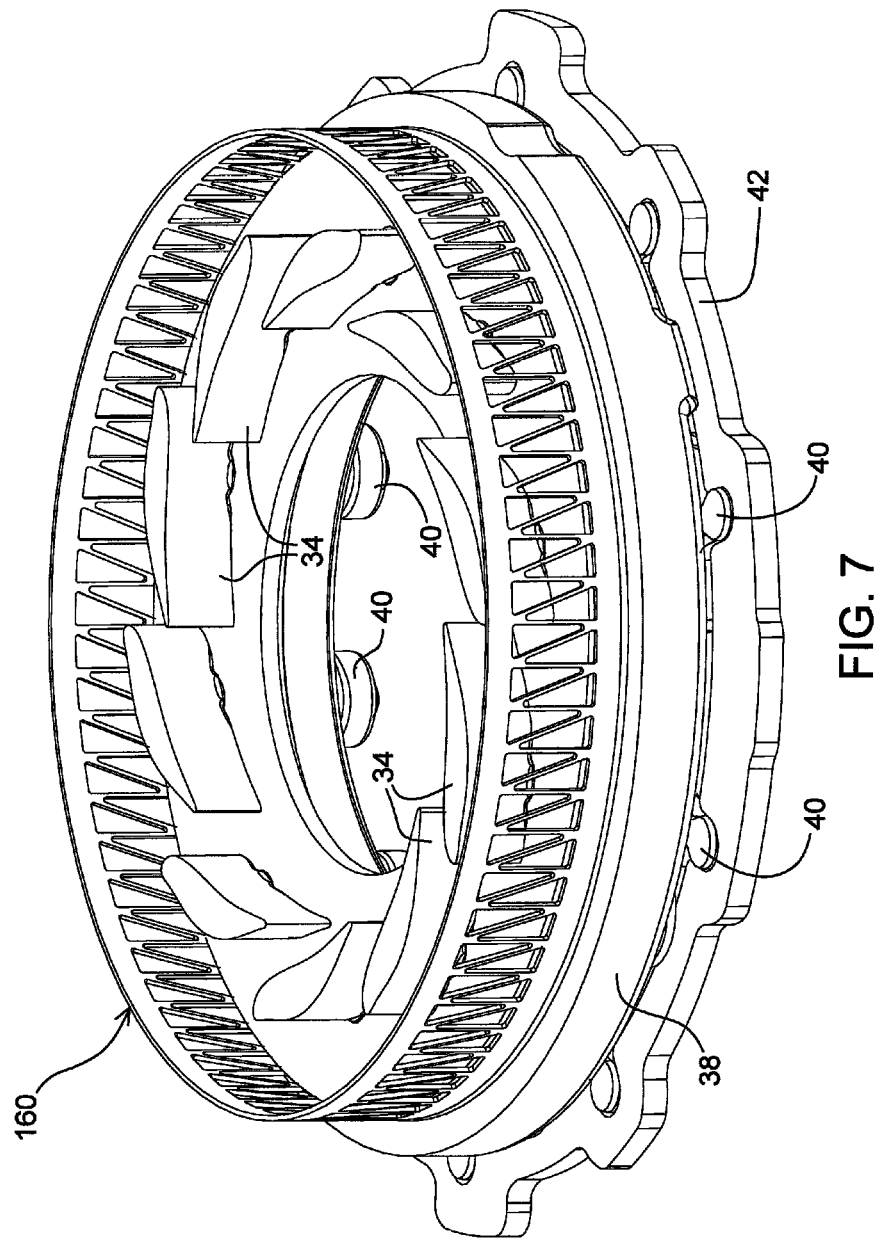
FIG. 7 is a perspective view showing the wire cage of FIG. 6 assembled with the sub-assembly of FIG. 4.
Figure 8:
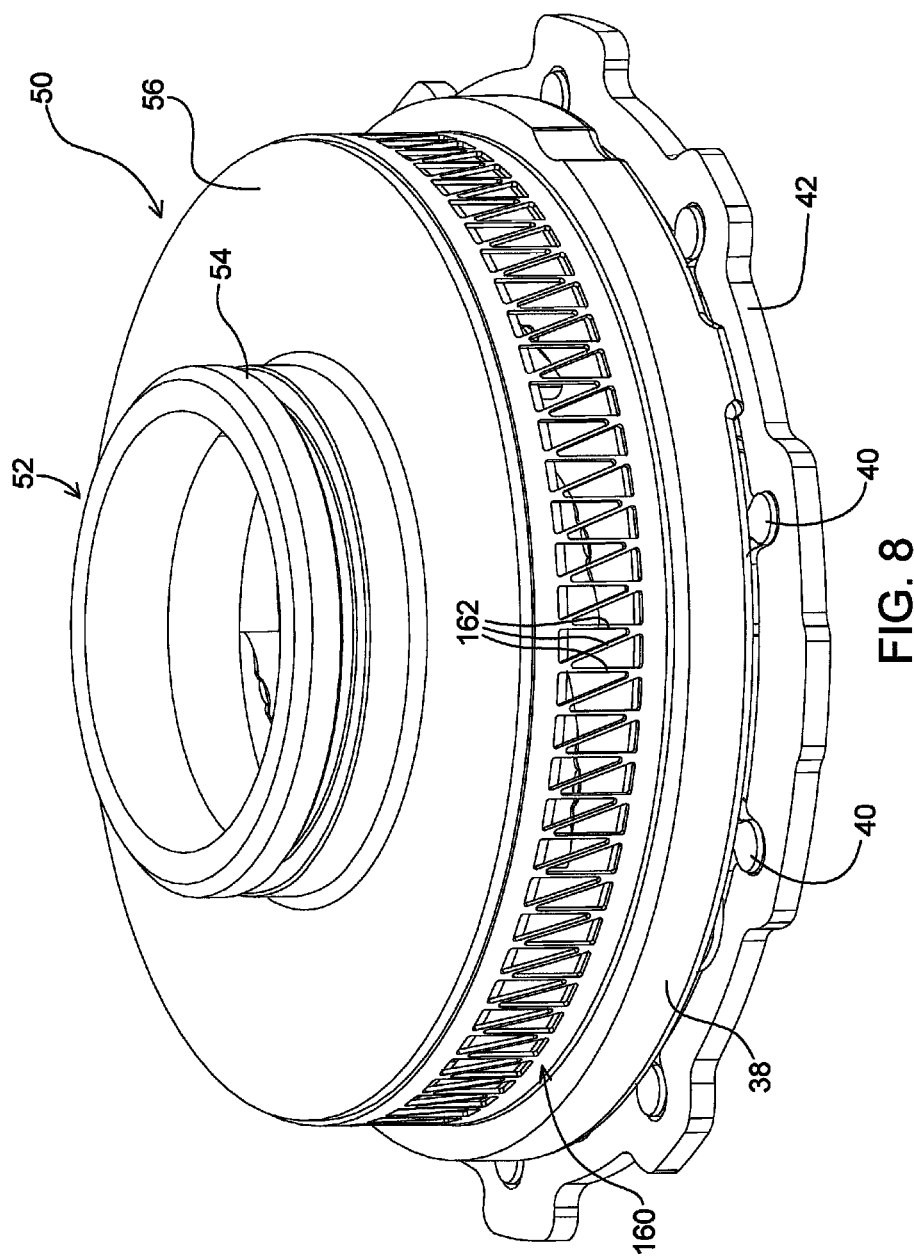
FIG. 8 is a perspective view of a variable-vane assembly having the wire cage of FIG. 6.

In an alternative embodiment depicted in FIGS. 6 through 8, a wire cage 160 is constructed as a one-piece integral structure. The wire cage 160 comprises a strip of metal foil formed into a hoop shape and having a plurality of circumferentially spaced apertures 161 formed therein. Wires 162 are defined by material of the foil that remains between adjacent ones of the apertures. In the illustrated embodiment, the apertures are triangular, and are arranged such that, proceeding in a circumferential direction about the wire cage, the wires alternately extend parallel to the axial direction and obliquely with respect to the axial direction. The triangular apertures provide some cross-bracing to resist torsional deformation of the foil and subsequent movement of the insert relative to the nozzle ring. Alternatively, of course, numerous other configurations of apertures, and resulting wire orientations, could be used instead. For example, the apertures could be simple rectangular cutouts or any other punched shape.

As yet another alternative wire cage construction, the wire cage can comprise a continuous length of wire bent to undulate back and forth like a waveform, the undulating wire then being formed into a hoop shape and affixed to the nozzle ring and nozzle portion. The undulating wire can be affixed to one or more metal tapes in a fashion similar to that described for the first embodiment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger having a variable-nozzle turbine, comprising:
a turbine assembly comprising a turbine housing and a turbine wheel mounted in the turbine housing and connected to a rotatable shaft for rotation therewith, the turbine housing defining a chamber surrounding the turbine wheel for receiving exhaust gas from an engine and for supplying the exhaust gas to the turbine wheel, the turbine assembly defining a nozzle leading from the chamber generally radially inwardly to the turbine wheel, the turbine housing further defining an axially extending bore through which exhaust gas is discharged after passing through the turbine wheel;
a compressor assembly comprising a compressor housing and a compressor wheel mounted in the compressor housing and connected to the rotatable shaft for rotation therewith;
a center housing connected between the compressor housing and the turbine housing; and
a variable-vane assembly connected between the center housing and the turbine housing, the variable-vane assembly comprising:
a generally annular nozzle ring and an array of vanes circumferentially spaced about the nozzle ring and disposed in the nozzle such that exhaust gas flows between the vanes to the turbine wheel, each vane being rotatably mounted to the nozzle ring and connected to a rotatable actuator ring such that rotation of the actuator ring rotates the vanes for regulating exhaust gas flow to the turbine wheel;

an insert having a tubular portion sealingly received into the bore of the turbine housing and having a nozzle portion extending generally radially out from one end of the tubular portion, the nozzle portion being axially spaced from the nozzle ring such that the vanes extend between the nozzle ring and the nozzle portion; and a ring-shaped wire cage disposed radially outwardly of the vanes and having one axial end rigidly affixed to the nozzle ring and an opposite axial end rigidly affixed to the nozzle portion so as to fix a spacing between the nozzle ring and the nozzle portion in an axial direction of the turbocharger, the wire cage having a plurality of circumferentially spaced wires extending generally in the axial direction between the nozzle ring and the nozzle portion.

2. The turbocharger of claim 1, wherein a lengthwise direction of each of the wires is parallel to the axial direction.

3. The turbocharger of claim 1, wherein the wire cage includes a first hoop portion rigidly affixed to the nozzle ring and a second hoop portion rigidly affixed to the nozzle portion, and wherein opposite ends of each of the wires are rigidly affixed to the first and second hoop portions, respectively.

4. The turbocharger of claim 3, wherein the first and second hoop portions and the wires are integral and of one piece with one another.

5. The turbocharger of claim 4, wherein the wire cage comprises a strip of metal foil formed into a hoop shape and having a plurality of circumferentially spaced apertures formed therein, the wires being defined by material of the foil that remains between adjacent ones of said apertures.

6. The turbocharger of claim 5, wherein the apertures are triangular.

7. The turbocharger of claim 6, wherein the apertures are arranged such that, proceeding in a circumferential direction about the wire cage, the wires alternately extend parallel to the axial direction and obliquely with respect to the axial direction.

8. The turbocharger of claim 1, wherein the wire cage comprises a continuous length of wire bent to undulate in a circumferential direction of the wire cage.

9. A variable-vane assembly for a variable-nozzle turbine, the variable-vane assembly comprising:

a generally annular nozzle ring and an array of vanes circumferentially spaced about the nozzle ring, each vane being rotatably mounted to the nozzle ring and connected to a rotatable actuator ring such that rotation of the actuator ring relative to the nozzle ring rotates the vanes for regulating exhaust gas flow through the array of vanes;

an insert having a tubular portion structured and arranged to be sealingly received into a bore of a turbine housing and having a nozzle portion extending generally radially out from one end of the tubular portion, the nozzle portion being axially spaced from the nozzle ring such that the vanes extend between the nozzle ring and the nozzle portion; and a ring-shaped wire cage disposed radially outwardly of the vanes and having one axial end rigidly affixed to the nozzle ring and an opposite axial end rigidly affixed to the nozzle portion so as to fix a spacing between the nozzle ring and the nozzle portion in an axial direction of the variable-vane assembly, the wire cage having a plurality of circumferentially spaced wires extending generally in the axial direction between the nozzle ring and the nozzle portion.

10. The variable-vane assembly of claim 9, wherein a lengthwise direction of each of the wires is parallel to the axial direction.

11. The variable-vane assembly of claim 9, wherein the wire cage includes a first hoop portion rigidly affixed to the nozzle ring and a second hoop portion rigidly affixed to the nozzle portion, and wherein opposite ends of each of the wires are rigidly affixed to the first and second hoop portions, respectively.

12. The variable-vane assembly of claim 11, wherein the first and second hoop portions and the wires are integral and of one piece with one another.

13. The variable-vane assembly of claim 12, wherein the wire cage comprises a strip of metal foil formed into a hoop shape and having a plurality of circumferentially spaced apertures formed therein, the wires being defined by material of the foil that remains between adjacent ones of said apertures.

14. The variable-vane assembly of claim 13, wherein the apertures are triangular.

15. The variable-vane assembly of claim 14, wherein the apertures are arranged such that, proceeding in a circumferential direction about the wire cage, the wires alternately extend parallel to the axial direction and obliquely with respect to the axial direction.

16. The variable-vane assembly of claim 9, wherein the wire cage comprises a continuous length of wire bent to undulate in a circumferential direction of the wire cage.

17. The variable-vane assembly of claim 9, wherein the nozzle ring defines a cylindrical surface facing radially outward, and the nozzle portion defines a cylindrical surface facing radially outward, and the wire cage engages both of the cylindrical surfaces and is rigidly affixed thereto.

* * * * *